United States Patent [19]

Daniels

[11] Patent Number: 4,519,256

[45] Date of Patent: May 28, 1985

[54] PRESSURE TRANSDUCER INCLUDING A PROXIMITY SENSOR

[75] Inventor: Ted M. Daniels, Edmonds, Wash.

[73] Assignee: Eldec Corporation, Lynnwood, Wash.

[21] Appl. No.: 475,309

[22] Filed: Mar. 14, 1983

[51] Int. Cl.³ .......................... G01L 7/16; G01L 9/10
[52] U.S. Cl. ........................................ 73/745; 73/4 R; 200/82 A; 307/118
[58] Field of Search ................ 73/745, 746, 4 R; 200/82 A, 82 C; 307/118

[56] References Cited

U.S. PATENT DOCUMENTS

| | | | |
|---|---|---|---|
| 3,419,692 | 12/1968 | Palen | 200/82 C |
| 3,548,133 | 12/1970 | Clauson | 200/81.9 |
| 3,746,810 | 7/1973 | Parsons et al. | 200/81 R |
| 4,071,725 | 1/1978 | Smith et al. | 200/82 E |
| 4,213,021 | 7/1980 | Alexander | 200/81.9 |
| 4,254,312 | 3/1981 | Migrin et al. | 200/61.25 |

*Primary Examiner*—Donald O. Woodiel

*Attorney, Agent, or Firm*—Christensen, O'Connor, Johnson & Kindness

[57] ABSTRACT

Fluid under pressure is routed through an input port to a bore provided within a housing. A piston is disposed within the housing for movement within the bore. A target member includes a piston portion which frictionally engages, and is received within, the wall of a bore provided in the piston, causing the piston and target to move as a unit. A proximity sensor mounts to the housing in a location to switch to its activated state in response to displacement of the target member to a position corresponding to a predetermined fluid pressure level. Spring packs, exhibiting a predetermined wear characteristic, resiliently bias the piston to resist displacement due to applied fluid pressure. Compensation for spring pack wear and bearing contact wear is automatically provided by increased penetration of the target member piston portion into the piston bore upon application of a fluid pressure substantially in excess of the switching level, whereby the proximity sensor is activated at a set fluid pressure level substantially independent of spring pack system wear.

15 Claims, 2 Drawing Figures

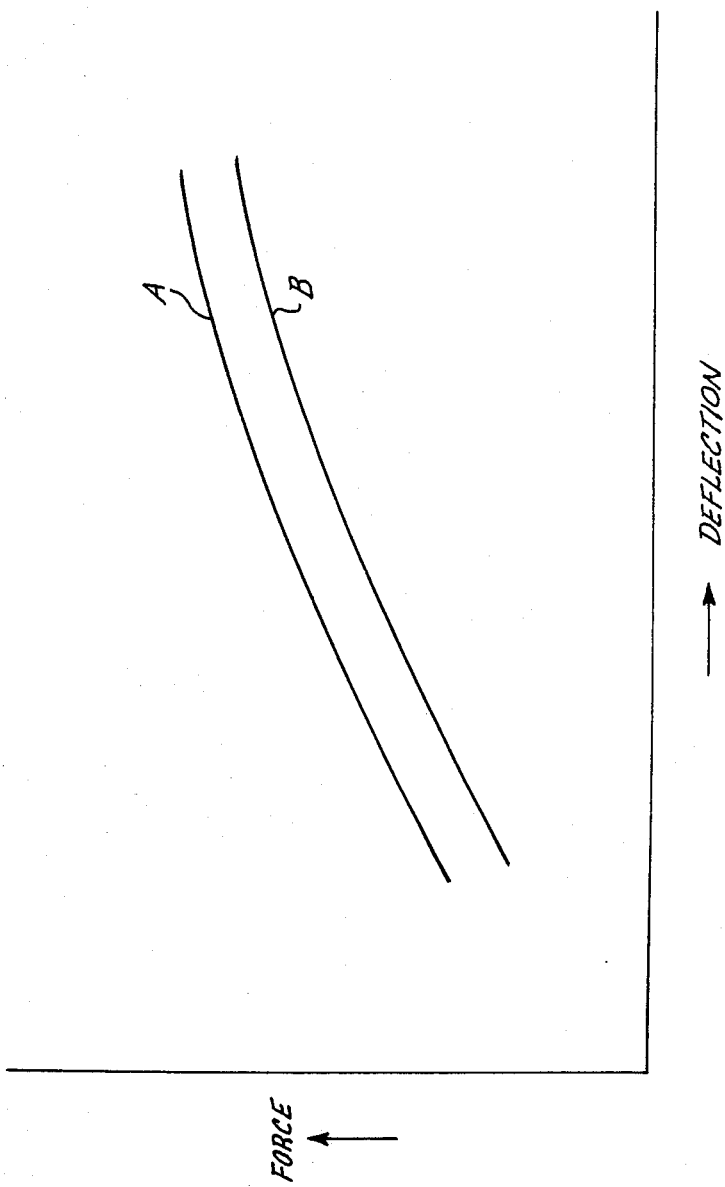

PRESSURE TRANSDUCER INCLUDING A PROXIMITY SENSOR

BACKGROUND OF THE INVENTION

The present invention pertains to the pressure transducer art and, more particularly, to a means for producing an activated electrical switching state in response to a predetermined fluid pressure level.

Numerous pressure transducer switching systems are known to the prior art. Such systems commonly employ a piston which is caused to displace as a function of applied fluid pressure. A spring system force bias on the piston resists fluid pressure displacement such that piston movement occurs only for applied fluid pressures above a predetermined level and through a predetermined range to a travel limiting stop.

Commonly, mechanical switch contacts are positioned to be activated by the piston in its displaced state. Such mechanical contact type switching systems have suffered from several disadvantages. The switch contacts have been known to chatter under vibration, and are susceptible to corrosion and wear. In addition, inasmuch as the mechanical contacts require moving elements, the repeatability of activation of the switch at a given displacement of the piston has been, for certain applications, unacceptable. Also, over-center snap action electrical switches, normally used to improve switch contact reliability and life, add to the hysteresis, or "dead-band," between switch "open" and "closed" pressure levels.

Attempts have been made at eliminating the mechanical switching contacts by the use of a proximity switch, such as of the magnetic type. Thus, for example, a magnetically responding switch may be positioned at a predetermined position with respect to the travel of the piston such that a magnet, or magnetic material on the piston activates the switch. Whereas the use of such proximity switches has eliminated the problems due to mechanical switch contact wear and wide "dead-band," none of the pressure transducer type switches known in the prior art have provided a means to compensate for the effects of wear in the spring system. Typically, as the spring system and contacting bearing members wear, a given amount of fluid pressure creates a greater total displacement of the piston. Thus, a system originally designed to switch at a given pressure and a specific physical displacement will, with wear of the spring and bearing contact areas, begin switching at a lesser pressure. Without a means to compensate for spring system wear, such prior art systems have required recalibration, or replacement in applications wherein switch activation at a predetermined fluid pressure is critical.

SUMMARY OF THE INVENTION

There is a need in this art, therefore, for a pressure responsive switching means, which switching means utilizes a proximity sensor and which includes means to compensate for wear of the spring system.

Briefly, according to the invention, apparatus for activating an electrical switching means in response to a predetermined applied fluid pressure level includes a housing having a provided bore and an inlet port for introducing fluid under pressure into the bore. A piston is disposed within the housing and is slidable within the bore. The piston has first and second ends, the first end having a face portion with an effective area for reacting with the fluid under pressure. A target means includes a piston portion and a target portion. The piston portion has a mating relationship with the second end of the piston such that the piston and target means move as a unit. A switching means mounts to the housing and is positioned to be activated by the target portion in response to a predetermined displacement of the piston and target means unit resulting from a predetermined applied fluid pressure level. A spring means provides a reaction force to the piston means for resisting displacement of the piston in response to applied fluid pressure. The spring means exhibits a wear characteristic such that the reaction force varies with bias means wear in a predetermined manner. Compensating means compensates the apparatus for the predetermined spring means wear characteristic such that the switching means is activated by the target portion at said predetermined fluid pressure level substantially independent of the spring means wear characteristic.

Preferably, the switching means is comprised of a proximity sensor.

BRIEF DESCRIPTION OF THE DRAWINGS

FIG. 2 is a graph illustrating the wear characteristics of the spring system means utilized in the embodiment of FIG. 1.

DETAILED DESCRIPTION OF THE PREFERRED EMBODIMENT

Figure 1:
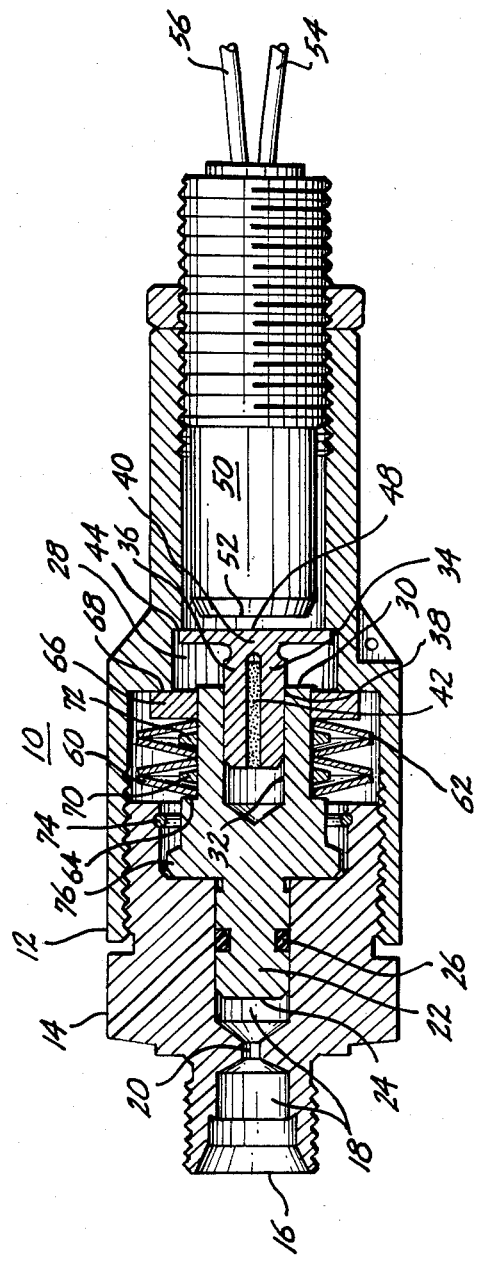
FIG. 1 is cross-sectional view of the preferred embodiment of the pressure transducer including a proximity sensor.

Referring to FIG. 1, a pressure transducer housing, indicated generally at 10, is comprised of housing portions 12, 14. The housing portions 12, 14 mate, as shown, by thread engagement.

An inlet port 16 in housing portion 14 routes a fluid under pressure into a bore 18 provided in the housing. This bore has a restriction portion 20 which provides filtering to prevent fluctuations in fluid pressure from causing chattering of the transducer moving parts.

A piston 22 is disposed within the housing for slidable movement in the bore 18. The piston has a first end effective surface area 24 which reacts to applied fluid pressure. An O-ring type seal 26 prevents the fluid from penetrating to the anterior portion of piston 22, thereby defining effective area 24.

A chamber 28 is defined by cavities provided in the housing 10. Located within chamber 28 is the second end portion 30 of the piston 22. The second end portion 30 is provided with an axial bore 32. Received within axial bore 32, are the bifurcated fingers 34, 36 of the piston portion 38 of a target assembly 40.

A rubber plug 42 is disposed between the fingers 34, 36, urging the fingers into frictional engagement with the wall of the piston bore 32. In this manner, piston 22 and target assembly 40 move as a unit.

Ultimate travel of the target assembly 40 in response to applied fluid pressure is defined by stop 44 formed within housing 12 which interferes with the target portion 48 of target assembly 40.

A conventional proximity sensor 50 mounts to the housing 10 by thread engagement. Proximity sensor 50, which may be of the inductive, capacitive, or optical type, acts in the known manner to produce an electrical switching action in response to the face 52 of sensor 50 being in predetermined proximity with the target portion 48 of target assembly 40. This switching action is reflected at the output leads 54, 56 of the proximity sensor.

A series of spring packs 60, 62 are positioned within cavity 28. While two such spring packs are illustrated, it should be understood that any number of series arranged spring packs may be used in a given application. The spring pack pairs are disposed between a stop portion 64 on piston 22 and a stop washer 66 which bears against a shoulder 68 of the housing 10. Here, the spring packs 60, 62 are comprised of Belleville washers having interleaved, rigid stop members, such as members 70, 72. The rigid stop members, which may be made of a suitable plastic, have tapered opposing surfaces adapted to conform to the opposing surfaces of the Belleville washers upon compression. In this manner, the total compression of the spring packs 60, 62 is predeterminedly limited.

Also included within the chamber 28 is a stop ring 74 which acts to engage a shoulder 76 on piston 22 in the event of a failure of the housing 12 so as to limit the movement of the piston 22 to an amount that is less than that which would result in O-ring seal 26 exiting from bore 18 with a resultant loss of fluid pressure.

Operation of the pressure proximity switch of FIG. 1 is understood as follows. At zero fluid pressure, the stop washer 66 abuts shoulder 68 and the spring packs 60, 62 force piston 22 in its leftmost position within the bore 18. At this point, housing portion 12 is screwed onto housing portion 14 thereby compressing the spring packs 60, 62 to a predetermined "preload" percentage of the maximum force provided by the spring packs upon full compression. This preload percentage represents a pressure that is below the desired switching point. At the preload compression the Belleville washers are not contacting their interleaved rigid stop members and the target portion has its face 48 abutting the stop 44 on housing 12.

Thereafter, a fluid pressure substantially in excess of the switching point is routed through inlet port 16 to bore 18. The subsequent reaction with the effective face area 24 of piston 22 causes piston 22 to displace to the right thereby compressing the spring packs 60, 62 until the Belleville washers contact the interleaved washers, thereby "shorting" the spring packs and inhibiting further piston movement. The shorting of the spring packs is designed to occur at a predetermined "stop" percentage of the maximum compressive spring force, with the stop percentage representing a pressure exceeding the switching point. Shorting the spring packs at a force and deflection level well below the maximum also improves fatigue life and spring curve stability and repeatability.

Inasmuch as the target assembly 40 is prevented from displacement to the right due to the abutment of target portion face 48 against housing stop 44, the aforedescribed displacement to the right of piston 22 causes the piston portion 38 to further penetrate the piston bore 32.

Thereafter, fluid pressure is reduced to the desired switching point, whereby piston 22 and target assembly 40 move to the left. Now, the proximity sensor 50 is screwed into the housing 12 until switch actuation of proximity sensor 50 occurs. This switching action occurs, as described hereinabove, when the target face 52 is at a predetermined distance from the face portion 48 of target assembly 40. The aforedescribed procedure calibrates the pressure switch to a "decreasing" pressure set point. If an "increasing" set point is desired, the pressure is reduced to well below the desired set point and then increased until the desired pressure is reached. The difference between these two procedures removes system friction from set point calibration.

In normal operation, piston 22 will move only when the applied fluid pressure is between that represented by the preload percentage and that represented by the stop percentage, typical values of which are 20 percent and 70 percent of the maximum compressive force of the spring packs. The switching point is, as described, between the pressures represented by the preload and the stop percentage.

As the pressure proximity switch is subjected to repeated use, the spring packs 60, 62 and their abutting bearing surfaces exhibit a predictable wear characteristic such that the effective length of the springs and bearing surfaces is less with the same applied fluid pressure. Note that most of the spring pack wear and local yielding will occur where the inside diameters of the springs are in contact either with each other or with the reaction bearing surfaces of the piston 64 or the stop washer 66 spring contact area. The area of the spring couple in bearing contact at the outside diameter is increased by the ratio of the outer diameter to the inner diameter of the individual Belleville spring (typically two times). Outside diameter wear and yield is reduced by this ratio. As a result, piston 22 and target assembly 40 are displaced more to the right with constant fluid pressure, thereby leading to a loss of switching action calibration. The present pressure proximity switch, however, includes means to automatically recalibrate in a manner understood as follows.

Firstly, referring to FIG. 2, it is noted that the spring pack couples always follow the same shaped curve of force versus deflection as long as the they are not fully compressed, something which cannot happen due to the action of the interleaved stop washers. Thus, curve A of FIG. 2 illustrates the force versus deflection characteristic of a spring pack before substantial wear occurs. Curve B illustrates the same spring pack, using the same positional reference, having suffered substantial wear. Here it is seen that the two curves are of substantially the same shape, one being merely displaced a vertical distance from the other. Note, however, that the resultant Curve B actually represents a increase in deflection, relative to the original positional reference, and is caused by wear and local yielding in the spring system. Translation of Curve B to the left by the amount of wear and yield would overlay Curve B on Curve A.

Secondly, upon application of fluid pressure levels which substantially exceed the switching level, the piston 22 and target assembly 40 will be forced to the right causing the target portion 48 to impinge upon stop member 44. This will result in increased penetration of the piston portion 38 into the piston bore 32 thereby decreasing the overall length of the piston 22 and target assembly 40 unit. The increased amount that the piston portion 38 penetrates the piston bore 32 is exactly equal to the amount by which the piston 22 moves to the right due to the external wear of the inner diameter mating surfaces of the spring packs and the mating bearing surfaces of the piston 64 and the stop washer 66. Inasmuch as the spring packs retain the shape of their force versus deflection curve over wear, it is seen that the target face 48 will thereafter reach the predetermined distance from face 52 of proximity sensor 50 at the switching point for which the pressure proximity switch was initially calibrated. In this manner, the unit is capable of automatic recalibration to compensate for spring pack and bearing surface wear external to the spring couples.

In summary, an improved pressure transducer including a proximity sensor has been described in detail. The unit is capable of automatic compensation for wear of the spring system.

While a preferred embodiment of the invention has been described in detail, it should be apparent that many modifications and variations thereto are possible, all of which fall within the true spirit and scope of the invention.

The embodiments of the invention in which an exclusive property privilege is claimed are defined as follows:

1. Apparatus for activating electrical switching means in response to a predetermined applied fluid pressure level comprising:
   a housing having a provided bore and an inlet port for introducing fluid under pressure into said bore;
   a piston disposed within the housing and being slidable within said bore, the piston having first and second ends, the first end having a face portion with an effective area for reacting with the fluid under pressure;
   target means having a piston portion and a target portion, said piston portion having a mating relationship with the second end of said piston such that the piston and target means move as a unit;
   switching means mounted to said housing and positioned to be activated by said target means target portion in response to a predetermined displacement of said piston and target means unit resulting from a predetermined applied fluid pressure level;
   spring means providing a reaction force to said piston means for resisting displacement of said piston in response to applied fluid pressure, said spring means exhibiting a wear characteristic such that said reaction force varies with spring means wear in a predetermined manner; and
   compensating means compensating said apparatus for said predetermined spring means wear characteristic such that said switching means is activated by said target portion at said predetermined fluid pressure level substantially independent of said wear characteristic.

2. The apparatus of claim 1 wherein the compensating means comprises unit adjustment means responsive to said spring means wear for decreasing the overall length of said piston and target means unit.

3. The apparatus of claim 2 wherein said spring means is comprised of cascaded spring segments having interleaved stop members, said stop members preventing compression of said spring segments beyond a predetermined limit.

4. The apparatus of either one of claims 2 or 3 wherein said unit adjustment means further comprises:
   stop member means affixed to said housing for preventing displacement of said piston and target means unit beyond a predetermined limit upon application of a fluid pressure level in excess of said predetermined level required for activating said switching means, said piston and target means unit having a mating relationship such that the overall length of said unit predeterminedly varies upon the unit impinging upon the stop means to compensate for the wear characterisitc of said spring means.

5. The apparatus of either one of claims 1 or 2 wherein said switching means comprises a proximity sensor.

6. The apparatus of claim 4 wherein said switching means comprises a proximity sensor.

7. A pressure transducer for detecting a predetermined pressure level of a fluid comprising:
   a housing having a bore provided therein and an inlet port for routing fluid under pressure into said bore;
   a piston disposed within said housing for movement within said bore, said piston having a first end, facing said inlet port, and a second end;
   spring means for urging said piston towards said inlet port, said spring means exhibiting a predetermined wear characteristic;
   target means having a piston portion and a target portion, said piston portion having an interpenetrating mating relationship with the second end of said piston such that a controlled frictional fit is formed therebetween providing common movement of said piston and said target means, said mating relationship causing one of said piston and piston portion to penetrate the other of said piston and piston portion upon application of sufficient force;
   stop means being provided within the housing for preventing movement of said target portion, in response to fluid pressure, beyond a predetermined position; and
   switching means mounted to said housing in positional relationship with said target portion such that a predetermined displacement of said target portion corresponding to a predetermined fluid pressure level causes said switching means to switch to an activated state,
   said spring means predetermined wear characteristic and said piston and piston portion mating relationship being selected such that a reduced force due to spring means wear is compensated for by increased interpenetration of said piston and piston portion in response to an applied fluid pressure in excess of the pressure required to activate said switching means forcing the target means against the stop means, whereby the switching means switches to its activated state at said predetermined fluid pressure level substantially independent of said wear characteristic.

8. The pressure transducer of claim 7 wherein the spring means comprises:
   cascaded spring sections having interleaved stop members, said stop members preventing compression of said spring sections beyond a predetermined limit.

9. The pressure transducer of either one of claims 7 or 8 wherein said piston second end has a provided bore for receiving the piston portion of said target means and wherein said piston portion is comprised of bifurcated finger sections normally biased to bear against the wall of said piston bore to thereby produce said friction fit between said piston and said target means.

10. The pressure transducer of claim 9 wherein said piston portion further includes a resilient element disposed between said bifurcated fingers urging said fingers into frictional engagement with the wall of said piston bore.

11. The pressure transducer of either one of claims 7 or 8 further comprising:
   a stop member affixed to said housing for preventing movement of said piston beyond a predetermined position in response to an applied fluid pressure.

12. The pressure transducer of claim 9 further comprising:

a stop member affixed to said housing for preventing movement of said piston beyond a predetermined position in response to an applied fluid pressure.

13. The pressure transducer of either one of claims 7 or 8 wherein said switching means is comprised of a proximity sensor switch.

14. The pressure transducer of claim 8 wherein said switching means is comprised of a proximity sensor switch.

15. The pressure transducer of claim 11 wherein said switching means is comprised of a proximity sensor switch.

* * * * *